United States Patent [19]

Tax et al.

[11] Patent Number: 4,990,046

[45] Date of Patent: Feb. 5, 1991

[54] APPARATUS FOR LOADING CONTAINERS ON TO SHIPS AND UNLOADING THEM THEREFROM

[75] Inventors: Hans Tax, Munich; Klaus Hösler, Eichenau, both of Fed. Rep. of Germany

[73] Assignee: Tax Ingenieurgesellschaft mbH, Munich, Fed. Rep. of Germany

[21] Appl. No.: 384,294

[22] Filed: Jul. 21, 1989

[30] Foreign Application Priority Data

Aug. 2, 1988 [DE] Fed. Rep. of Germany ....... 3826274

[51] Int. Cl.[5] ........................ B65G 67/60; B66C 23/68

[52] U.S. Cl. ................................ 414/141.4; 212/182; 414/141.3; 414/917

[58] Field of Search ............... 414/141.3, 141.4, 141.7, 414/917; 212/182, 183, 184

[56] References Cited

U.S. PATENT DOCUMENTS 2,887,235 5/1959 Ladner ......................... 414/141.3 X
3,891,079 6/1975 Roper .
4,018,349 4/1977 Hupkes ........................ 414/141.3 X

FOREIGN PATENT DOCUMENTS 433679 9/1926 Fed. Rep. of Germany ... 414/141.4
PS1906212 2/1971 Fed. Rep. of Germany .
2064978 3/1973 Fed. Rep. of Germany .
2726407 12/1977 Fed. Rep. of Germany .

*Primary Examiner*—Robert J. Spar
*Assistant Examiner*—Janice Krizek
*Attorney, Agent, or Firm*—Brumbaugh, Graves, Donohue & Raymond

[57] ABSTRACT

An apparatus for loading containers onto and unloading containers from ships, in which the ships receive the containers at locations of varying height, comprises a quayside carrier framework and a travelling carrier system fitted on the carrier framework, with a horizontal track on which at least one container-receiving crane trolley may travel. The travelling carrier system is mounted on the carrier framework for variation in height, with at least one power appliance being provided for the height displacement of the travelling carrier system. The travelling carrier system is supported by a rigid support member which is connected to the carrier framework by a lower link rod system and an upper link rod system. The link rod systems define a parallelogram linkage which is deformable by the power appliance provided, to enable the lifting and lowering of the rigid support member while maintaining the predetermined orientation of the rigid support member in space during its lifting and lowering.

17 Claims, 2 Drawing Sheets

10
12
14
16
18
20
22
22a,b
22c
22d,e
24
24a
24b
26
26a
26b
26c
26a,b
28
30
32
34
36
38
40
42
44
46
48
50
50a
50b
52
54
54a
54b
II
A
B
E
F

APPARATUS FOR LOADING CONTAINERS ON TO SHIPS AND UNLOADING THEM THEREFROM

THE PRIOR ART

In an apparatus known from DE PS No. 1,906,212 the travelling carrier system is fitted at an invariable height on the carrier framework.

In this connection various possibilities have been proposed for damping oscillations of the spreaders which are suspended by means of cables from the crane trolley.

PROBLEM OF THE INVENTION

The invention is based upon the problem of developing an apparatus of the kind as initially designated in the background of the invention so that in the case of a great stack height of containers above deck the cable swing problem in the serving of container standing places placed in the ship's interior or close above deck is facilitated and the transloading times are increased with acceptable hoisting speeds.

THE ESSENCE OF THE INVENTION

To solve this problem it is proposed in accordance with the invention that the travelling carrier system is fitted on the carrier framework for variation of height parallel to itself in operation, and that at least one power appliance is provided for the adjustment of height of the travelling carrier system.

This measure appears unusual if one imagines the size proportions: the height of the travelling carrier system above the quay level amounts for example to 45 m. The length of the travelling carrier system from the seaward end to the landward end amounts for example to 85 m. The stack height above deck amounts in the case of six containers stacked one above another for example to 15 m. With such dimensions hitherto the arrangement of the travelling carrier system at fixed height on the carrier framework was regarded as unavoidable and accordingly it was sought, ever again and over decades, to master the problem of cable swing by damping measures and the problem of transloading times by increasing the hoisting speed. The proposal in accordance with the invention therefore constitutes a fundamental departure from the former development trend in container crane technique. By this proposal the problem of the suppression of swing and the problem of the transloading times are now solved in a surprisingly simple manner: The lifting height of the containers or spreaders is considerably reduced in the case of a travelling carrier system of adjustable height, for in the loading and unloading of a ship the travelling carrier system can be adjusted in each case to a height just above the respective standing position height of the container above deck. The basis to be adopted here is that in the loading and unloading of the deckside containers of a container ship the containers are deposited and lifted, as the case may be, by layers progressing from one end of the ship to the other, so that the travelling carrier system can be set for each layer to a new working height, or for example in the case of six container layers above deck, can be adapted in height in each case after two layers. Thus the lifting height problem is reduced not only on the seaward side but also on the landward side, and correspondingly the problems of the cable swinging and the long transloading times are reduced.

For safety reasons and in order to relieve the power appliance, in further development of the invention it is proposed that the travelling carrier system can be fixed on the carrier framework at the respective working level.

In order to accustom the crane driver to defined lifting heights it is advisable for the travelling carrier system to be securable at discrete height positions the height difference of which corresponds approximately to one or more times the height of a container.

For the height adjustment of the travelling carrier system it would fundamentally be possible to provide a plurality of vertically acting power appliances with horizontal spacing from one another on the carrier framework. However a solution will be preferred wherein the travelling carrier system, is adjustable in height on the carrier framework by a system of links and the link system can be formed especially after the style of a parallelogram linkage. The advantage of such a solution resides in that the links of the link system can be articulated on the carrier framework to nodal points of the carrier framework and thus to a statically favourable power introduction into the carrier framework, which can easily be mastered by calculation, bending stressing of the carrier framework being largely avoided.

Further features of the invention appear from the Sub-Claims, which form a part of the disclosure.

BRIEF DESCRIPTION OF THE DRAWINGS

The invention is explained by reference to an example of embodiment by the accompanying Figures, wherein.

DESCRIPTION OF THE PREFERRED FORMS OF EMBODIMENT

Figures 1, 2:
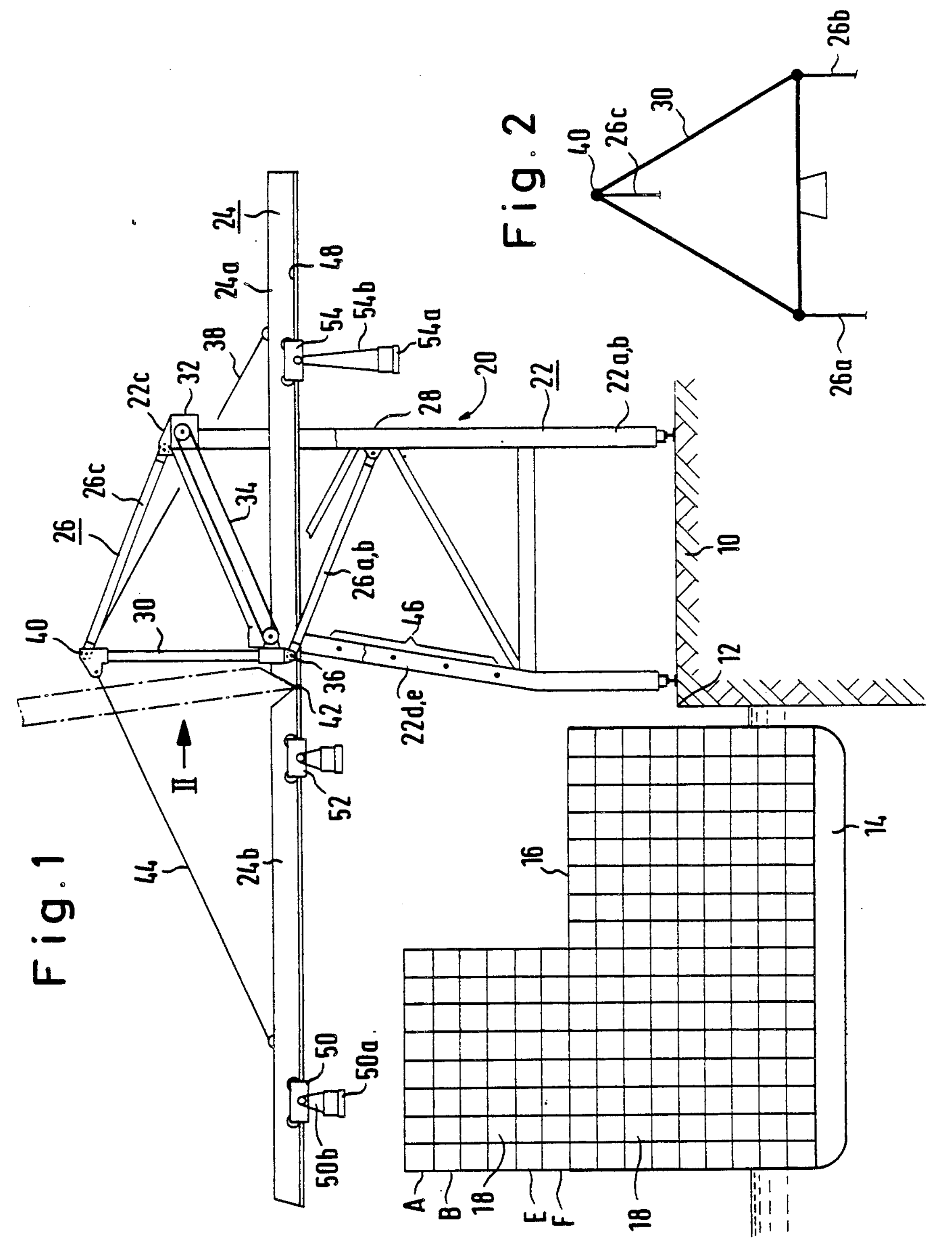
FIG. 1 shows a sectional view of an apparatus according to the invention, seen in the longitudinal direction of the quay edge.
FIG. 2 shows a diagrammatic elevation of the link system receiving the travelling carrier system, in the direction of the arrow II in FIG. 1.

In FIG. 1, the quay in a container harbour is designated by 10. The quay edge 12 extends perpendicularly of the plane of the drawing. To the quay edge a container ship 14 is anchored which accommodates containers 18 stacked both in the interior of the ship and above the deck 16.

On the quay terrain there stands a container crane which is designated quite generally by 20. This container crane 20 comprises a carrier framework 22 and a travelling carrier system 24. The travelling carrier system 24 consists of a landward travelling carrier section 24*a* and a seaward, upwardly pivotable, travelling carrier section 24*b*. The travelling carrier system 24 is secured to a link system 26. This link system 26 is formed by two lower connection links 26*a*, 26*b* and an upper connection link 26*c*. The lower connection links 26*a*, 26*b* are articulated to nodal points 28 of rearward posts 22*a*, 22*b* of the carrier framework 22, while the connection link 26*c* is articulated in the middle of a connection girder 22*c*, extending perpendicularly of the plane of the drawing, of the carrier framework 22. The other ends of the connection links 26*a*, 26*b*, 26*c* are each respectively connected articulatedly with a rigid triangular plate 30 formed by links. On the connection girder 22 a winch mechanism 32 is fitted which is combined with a tackle block 34. The tackle block 34 extends diagonally in relation to the parallelogram linkage system 26 between the connection girder 22 and the plate 30. The triangular plate 30 can be pulled up by retraction of the tackle block 34 and by release of the tackle block it can be lowered. The landward travelling carrier 24*a* is articulated at an articulation point 36 to the triangular plate 30. The landward travelling carrier 24*a* is additionally suspended by a bracing cable 38 to the tip 40 of the triangular plate 30. The seaward travelling carrier 24*b* is articulated at 42 to the landward travelling carrier 24*a*, and suspended by a further bracing cable 44 likewise from the tip 40 of the triangular plate 30. The bracing cable 44 can be shortened so that the seaward travelling carrier 24*b* can be brought into the position as shown in dot-and-dash lines.

The entire travelling carrier system 24 can be raised or lowered by hauling in or release of the tackle block 34. In the forward posts 22*d* and 22*e* of the carrier framework there are formed attachment points 46. In these attachment points 46 there can be inserted attachment bolts for the landward travelling carrier 24*a*, so that the tackle block 34 can be relieved of load in different discrete height settings of the travelling carrier system 24. The attachments can here be formed so that the landward travelling carrier 24*a* rests displaceably on them, so that no bending forces are introduced into the posts 22*a* and 22*e*. Nor are any bending moments introduced through the links 26*a*, 26*b* and 26*c* into the posts 22*a*, 22*b*, since the links 26*a*, 26*b* are articulated into the nodal region 28 and the link 26*c* likewise is articulated in a nodal region at 22*c*.

On the travelling carrier system 24 a track 48 is formed which extends over the landward travelling carrier 24*a* and the seaward travelling carrier 24*b*. Three crane trolleys 50, 52 and 54 are mobile on the track 48. The crane trolley 50 is mobile over the range of the width of the container ship 14. The crane trolley 54 is mobile over the range of landward transport means which are arranged or mobile on the quayside terrain for the acceptance and handover of containers. The crane trolley 52 takes over container transport between the two crane trolleys 50 and 54. The transference of the containers between the individual crane trolleys can take place approximately as described in German Patent Specification No. 1,906,212.

The crane trolleys 50 and 54 are provided with spreaders 50*a* and 54*a* each hanging from hoist cables 50*b* and 54*b*. The spreader 50*a* can take up the containers 18 on the deck 16 and also—through hatches—the containers 18 in the interior of the ship. In FIG. 1 the travelling carrier system 24 is set to a height serving for the take-up of the uppermost stack row A of the containers stacked on deck. It is seen that the lifting height of the spreaders 50*a* is slight. The lifting time is correspondingly slight and the tendency of the hoist cables 50*b* to swing is correspondingly slight. When the uppermost row A of containers 18, or the two uppermost rows A and B, is or are cleared away, then the travelling carrier system 24 is lowered by one stage, so that then the height of the travelling carrier system 24 above the uppermost layer of containers in each case is again the same as in FIG. 1.

Figure 3:
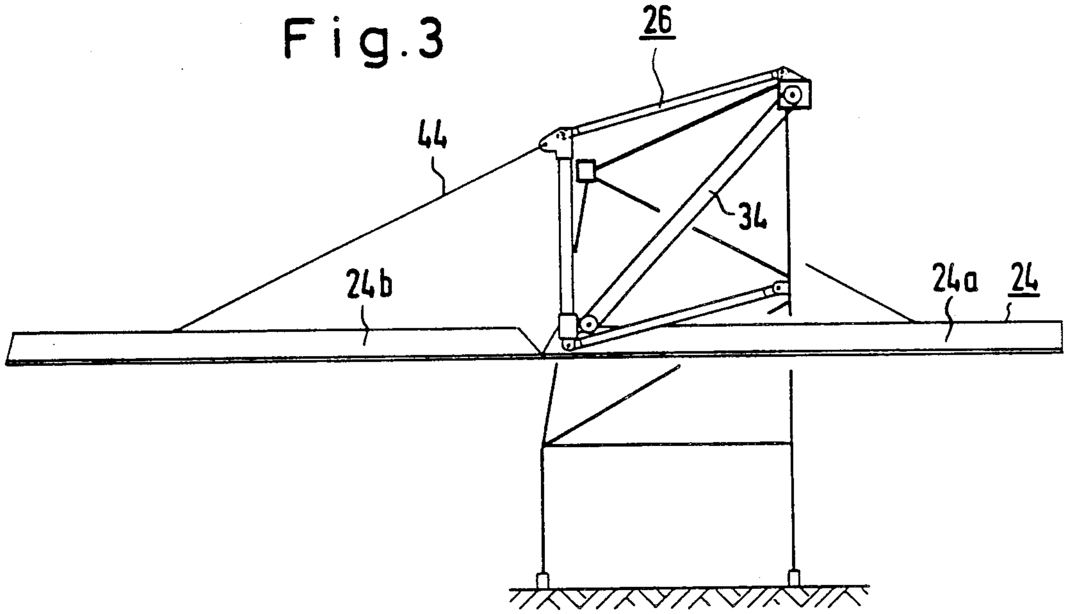
FIG. 3 shows the apparatus according to FIG. 1 with the travelling carrier system lowered.
Figure 4:
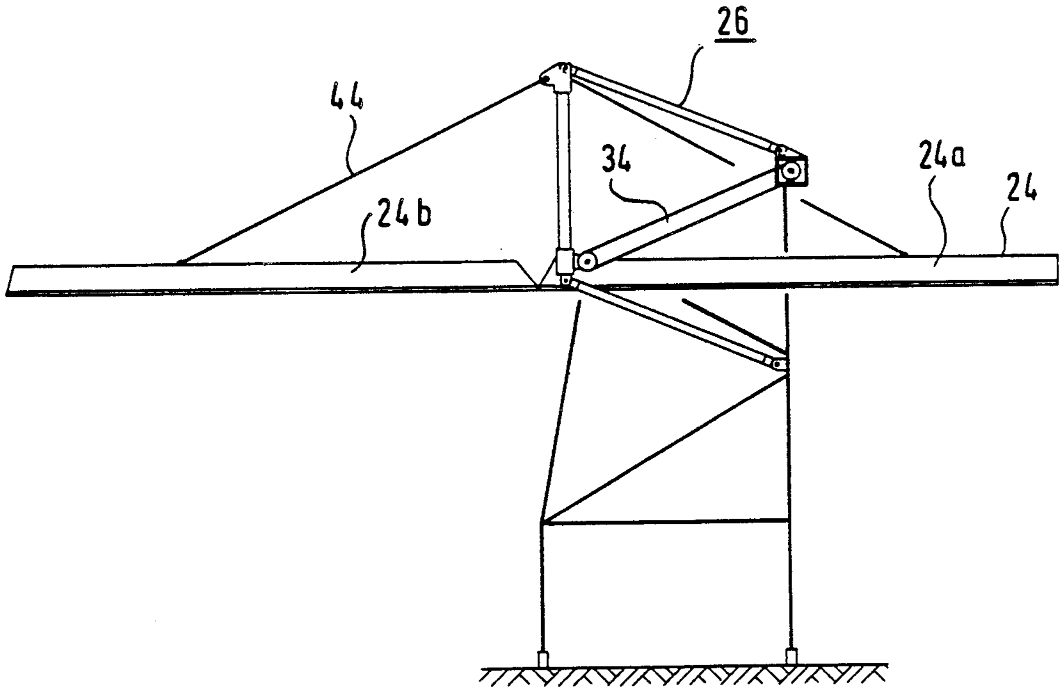
FIG. 4 shows the apparatus according to FIG. 1 with the travelling carrier system raised.

In FIG. 3 the travelling carrier system 24 is lowered to the lowest stage serving to serve the container layers E and F in FIG. 1.

The carrier framework 22 is mobile along the quay edge 12, so that by combination of movements of the carrier framework 22 and of the crane trolley 50 it is possible to approach every container position below deck and above deck.

What is said regarding the crane trolley 50 is also valid with regard to the crane trolley 54 and the pertinent spreader 54*a*. The hoisting height is reduced in each case to the minimum possible amount by lowering of the travelling carrier system 24.

The invention is not limited to the forms of embodiment as described.

The references serve merely for better understanding, and are not to be understood limitatively.

We claim:

1. Apparatus for loading containers onto and unloading containers from ships which receive the containers at locations of varying height, comprising a quayside carrier framework (22) and a travelling carrier system (24) fitted on the carrier framework (22), with a horizontal track (48) on which at least one container-receiving crane trolley (50) can travel, said travelling carrier system (24) being mounted on the carrier framework (22) for variation in height, at least one power appliance (34) being provided for the height displacement of the travelling carrier system (24), said travelling carrier system (24) being supported by a rigid support member (30) having a predetermined orientation in space, said rigid support member (30) being connected with said carrier framework (22) by a lower and an upper link rod system, each of said link rod systems comprising at least one link rod (26*a*, 26*b*, 26*c*) pivotally connected with said carrier framework (22) by a first respective end portion and with said rigid support member (30) by a second respective end portion at respective first and second pivot axes, said pivot axes being substantially horizontal and transverse to said horizontal track (48), said link rod systems being part of a parallelogram linkage (26) which also includes said rigid support member (30) and a portion of said carrier framework (22), said portion of said carrier framework (22) being a base portion of said parallelogram linkage (26), said parallelogram linkage (26) being deformable by said power appliance (34), so as to lift and lower said rigid support member (30) while maintaining said predetermined orientation in space during such lifting and lowering.

2. Apparatus according to claim 1, comprising securing means for securing said travelling carrier system (24) on the carrier framework (22) at different operational heights.

3. Apparatus according to claim 2, said securing means being adapted to secure said travelling carrier system (24) at discrete height positions (46), the height difference of which corresponds approximately to one and a plurality of times the height of a container (18).

4. Apparatus according to claim 1, said base portion (28, 22*c*) of said parallelogram linkage (26) being arranged approximately vertically in the carrier framework (22) and said rigid support member (30) being substantially parallel to said base portion (28, 22*c*).

5. Apparatus according to claim 4, said base portion (28, 22*c*) being formed by the upper end sections of two posts (22*a*, 22*b*) of the carrier framework (22), spaced in the longitudinal direction of the quay, said lower link rod system being formed by two lower, mutually substantially parallel link rods (26*a*, 26*b*) issuing from said base portion (28, 22*c*), said upper link rod system being formed by an upper link rod (26*c*), arranged between said two posts (22*a*, 22*b*) and substantially parallel to the two lower link rods (26*a*, 26*b*) and said rigid support member being formed by a triangular plate (30) which interconnects the second end portions of the lower link rods (26*a*, 26*b*) and the second end portion of the upper link rod (26*c*).

6. Apparatus according to claim 2, said carrier framework (22) comprising two post systems (22*a*, 22*b*; 22*d*, 22*e*) spaced transversely of the quay edge, said base portion (28, 22*c*) being arranged in the region of a first post system (22*a*, 22*b*), said rigid support member (30) being arranged in the region of a second post system (22*d*, 22*e*).

7. Apparatus according to claim 6, said base (28, 22*c*) being arranged in the region of a post system (22*a*, 22*b*) more remote from the quay edge and said rigid support member (30) being arranged in the region of a post system (22*d*, 22*e*) nearer to the quay edge.

8. Apparatus according to claim 6, wherein securing means are provided for securing said rigid support member (30) on the second post system (22*d*, 22*e*).

9. Apparatus according to claim 1, said travelling carrier system (24) being articulated to a lower region of said rigid support member (30) and being connected by tightening means (38, 44) with bracing points to an upper end region (40) of the rigid support member (30).

10. Apparatus according to claim 1, said travelling carrier system (24) comprising a landward section (24*a*) which is always horizontal and an upwardly pivotable seaward section (24*b*).

11. Apparatus according to claim 1, said crane trolley (50) being intended and formed for raising and lowering containers (18) and for their horizontal transport along the track (48).

12. Apparatus according to claim 1, at least one crane trolley (50) being intended and formed for raising and lowering the containers (18) and a further crane trolley (52) being intended and formed for the horizontal transport of the containers (18) along the track (48).

13. Apparatus according to claim 12, at least one seaward and at least one landward crane trolley (50, 54) being provided for raising and lowering and a further crane trolley (52) is provided for the horizontal transport of the containers (18) between the seaward and landward crane trolleys (50, 54).

14. Apparatus according to claim 1, said power appliance (34) being arranged between a fixed point (22*c*) of the carrier framework (22) and the parallelogram linkage (26).

15. Apparatus according to claim 14, said power appliance (34) being arranged substantially diagonally to the parallelogram linkage (26).

16. Apparatus according to claim 1, said power appliance (34) comprising a cable winch.

17. Apparatus according to claim 1, said power appliance comprising a hoist cylinder.

* * * * *

UNITED STATES PATENT AND TRADEMARK OFFICE

CERTIFICATE OF CORRECTION

PATENT NO. : 4,990,046

DATED : February 5, 1991

INVENTOR(S) : Hans Tax, et al.

It is certified that error appears in the above-identified patent and that said Letters Patent is hereby corrected as shown below:

Col. 1, line 5, insert the following:

--Background of the Invention

The invention relates to an apparatus for loading containers on to ships and unloading them therefrom, which ships receive the containers in their interior as well as on deck, comprising a quayside carrier framework and a travelling carrier system fitted on this carrier framework and having a horizontal travelling track on which at least one container-carrying crane trolley can travel.

The ships intended for container transport are becoming ever larger and accommodate containers in increasing stack heights both in the ship interiors and on deck. The greater does the stack height of the containers on deck become, the higher must the travelling carrier system stand above deck, so that even the uppermost containers of the stacks built up on deck can be picked up and especially so that the travelling carrier system does not come into collision with the container stacks. However at the same this signifies that the lifting height of the container reception frames (spreaders) suspended by means of

UNITED STATES PATENT AND TRADEMARK OFFICE
CERTIFICATE OF CORRECTION

PATENT NO. : 4,990, 046
DATED : February 5, 1991
INVENTOR(S) : Hans Tax, et al.

It is certified that error appears in the above-identified patent and that said Letters Patent is hereby corrected as shown below:

cables on the crane trolley and intended for container reception becomes ever greater, when the aim is to pick up a container in the interior of the ship or in an under stratum of the stacks built up on deck. This increasing lifting height brings difficulties in as much as the spreaders hanging on long cables all too easily get into swinging movements which render difficult the bringing of the containers to the destination in each case above deck or the bringing of a container into a deck hatch.

A further problem arises in that with increasing height of the travelling carrier system above deck the vertical hoist distances for a container arranged in the ship's interior or close above deck, which container is to be transported ashore, or _vice versa_, become greater. These travel distances determine the transloading times and thus finally the turnaround times of the ship concerned in harbour. These turnaround times constitute a considerable cost factor. In the past attempts have been made to reduce these transloading times, in the case of great hoisting heights, by the fact that the speeds of hoisting were correspondingly increased. However there are limits to increasing the hoisting speed, because of the equipment, but especially because of the performance capacity of the crane driver.--;

UNITED STATES PATENT AND TRADEMARK OFFICE
CERTIFICATE OF CORRECTION

PATENT NO. : 4,990,046

DATED : February 5, 1991

INVENTOR(S) : Hans Tax and Klaus Hossler

It is certified that error appears in the above-identified patent and that said Letters Patent is hereby corrected as shown below:

Col. 1, line 59, "to be adopted here is" should read --is to be adopted here--.

Col. 6, line 17 "is" should read--being--.

Signed and Sealed this

Fourth Day of August, 1992

Attest:

DOUGLAS B. COMER

*Attesting Officer*

*Acting Commissioner of Patents and Trademarks*